US012283214B2

(12) United States Patent
Pan

(10) Patent No.: US 12,283,214 B2
(45) Date of Patent: Apr. 22, 2025

(54) GOA CIRCUIT AND DISPLAY PANEL

(71) Applicant: WUHAN CHINA STAR OPTOELECTRONICS TECHNOLOGY CO., LTD., Wuhan (CN)

(72) Inventor: You Pan, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/290,684

(22) PCT Filed: Mar. 23, 2021

(86) PCT No.: PCT/CN2021/082380
§ 371 (c)(1),
(2) Date: Jun. 17, 2024

(87) PCT Pub. No.: WO2022/193341
PCT Pub. Date: Sep. 22, 2022

(65) Prior Publication Data

US 2025/0046223 A1 Feb. 6, 2025

(30) Foreign Application Priority Data

Mar. 16, 2021 (CN) ........................ 202110280928.X

(51) Int. Cl.
*G09G 3/20* (2006.01)

(52) U.S. Cl.
CPC ....... *G09G 3/20* (2013.01); *G09G 2300/0408* (2013.01); *G09G 2310/0267* (2013.01);
(Continued)

(58) Field of Classification Search
CPC ............. G09G 3/20; G09G 2300/0408; G09G 2310/0267; G09G 2310/0286; G09G 2320/043
See application file for complete search history.

(56) References Cited

U.S. PATENT DOCUMENTS

2017/0352129 A1* 12/2017 Fu .......................... B60K 35/60
2017/0352311 A1* 12/2017 Lee ...................... G09G 3/3225
(Continued)

FOREIGN PATENT DOCUMENTS

CN 107742509 A 2/2018
CN 107958656 A 4/2018
(Continued)

OTHER PUBLICATIONS

International Search Report in International application No. PCT/CN2021/082380,mailed on Dec. 17, 2021.
(Continued)

*Primary Examiner* — Sejoon Ahn
(74) *Attorney, Agent, or Firm* — PV IP PC; Wei Te Chung

(57) ABSTRACT

The present disclosure provides a gate driver on array (GOA) circuit including a plurality of GOA units disposed in N-stage cascade, and an nth-stage GOA unit includes a node control module, a pull-up module, a pull-down module, a pull-down maintaining module, and a stop control module, wherein $1<n<N-1$, and both the n and the N are positive integers.

18 Claims, 3 Drawing Sheets

(52) U.S. Cl.
CPC ............... *G09G 2310/0286* (2013.01); *G09G 2320/043* (2013.01)

(56) References Cited

U.S. PATENT DOCUMENTS

| | | | | |
|---|---|---|---|---|
| 2017/0352316 A1* | 12/2017 | Zhang | .................. | G09G 3/3233 |
| 2017/0352327 A1* | 12/2017 | Hodges | .................... | G09G 3/02 |
| 2017/0352328 A1* | 12/2017 | Jeong | ....................... | G09G 5/10 |
| 2017/0353628 A1* | 12/2017 | Kishigami | ........... | H04N 1/6077 |
| 2017/0358764 A1* | 12/2017 | Shin | ..................... | H10K 50/856 |
| 2020/0135772 A1 | 4/2020 | Lee | | |

FOREIGN PATENT DOCUMENTS

| | | |
|---|---|---|
| CN | 108010498 A | 5/2018 |
| CN | 109326261 A | 2/2019 |

OTHER PUBLICATIONS

Written Opinion of the International Search Authority in International application No. PCT/CN2021/082380,mailed on Dec. 17, 2021.

* cited by examiner

GOA CIRCUIT AND DISPLAY PANEL

RELATED APPLICATIONS

This application is a Notional Phase of PCT Patent Application No. PCT/CN2021/082380 having international filing date of Mar. 23, 2021, which claims the benefit of priority of Chinese Patent Application No. 202110280928.X filed on Mar. 16, 2021. The contents of the above applications are all incorporated by reference as if fully set forth herein in their entirety.

FIELD OF INVENTION

The present disclosure relates to the field of display, and more particularly, to a GOA circuit and a display panel.

BACKGROUND

Gate driver on array (GOA) technology is a technology in which a gate driving circuit is prepared on an array substrate in existing thin-film transistor array manufacturing process to realize progressive scanning of scan lines. However, when an existing GOA circuit is operated in a high temperature and a high humidity environment for a long time, thin-film transistors are extremely prone to an electrical leakage, which causes a malfunction of the GOA circuit.

SUMMARY

Technical Problem

The present disclosure provides a GOA circuit and a display panel to solve a technical problem that the GOA circuit operated in a long time is extremely prone to an electrical leakage, which causes a malfunction of the GOA circuit.

SOLUTIONS TO PROBLEMS

Technical Solutions

First, the present disclosure provides a GOA circuit, including a plurality of GOA units disposed in N-stage cascade, and an nth-stage GOA unit comprises a node control module, a pull-up module, a pull-down module, a pull-down maintaining module, and a stop control module, wherein $1<n<N-1$, and both the n and the N are positive integers;

wherein the node control module receives a previous-stage scan signal, a next-stage scan signal, a first scan control signal and a second scan control signal, and is electrically connected to a first node and a second node, and the node control module is configured to pull up a potential of the first node and pull down a potential of the second node according to the previous-stage scan signal, the next-stage scan signal, the first scan control signal and the second scan control signal;

wherein the pull-up module receives a current-stage clock signal, and is electrically connected to the first node, and the pull-up module is configured to output a current-stage scan signal at a current-stage scan signal output end according to the current-stage clock signal and the potential of the first node;

wherein the pull-down module is electrically connected to the second node, and the pull-down module is configured to pull down a potential of a scan signal output end according to the potential of the second node;

wherein the pull-down maintaining module receives a previous-stage clock signal, a next-stage clock signal, the first scan control signal, and the second scan control signal, and is electrically connected to the first node and the second node, and the pull-down maintaining module is configured to pull down the potential of the first node and pull up the potential of the second node according to the previous-stage clock signal, the next-stage clock signal, the first scan control signal and the second scan control signal; and wherein the stop control module receives a stop control signal, and the stop control module is configured to pull down a potential of the output end of the current-stage scan signal based on the stop control signal when the GOA circuit is in a touch stop stage, and the pull-down maintaining module is further configured to suppress an electrical leakage of the first node during the touch stop stage.

In the GOA circuit provided by the present disclosure, the node control module comprises a first transistor, a second transistor, a third transistor, a first capacitor and a second capacitor;

wherein a gate electrode of the first transistor receives the previous-stage scan signal, and a source electrode of the first transistor receives the first scan control signal, and a drain electrode of the first transistor is electrically connected to the first node;

wherein a gate electrode of the second transistor receives the next-stage scan signal, and a source electrode of the second transistor receives the second scan control signal, and a drain electrode of the second transistor is electrically connected to the first node;

wherein a gate electrode of the third transistor is electrically connected to the first node, and a source electrode of the third transistor receives a constant voltage low level signal, and a drain electrode of the third transistor is electrically connected to the second node;

wherein a first end of the first capacitor is electrically connected to the first node, and a second end of the first capacitor receives constant voltage low level signal;

wherein a first end of the second capacitor is electrically connected to the second node, and a second end of the second capacitor receives the constant voltage low level signal.

In the GOA circuit provided by the present disclosure, the pull-up module comprises a fourth transistor and a fifth transistor;

wherein a gate electrode of the fourth transistor receives a constant voltage high level signal, a source electrode of the fourth transistor is electrically connected to the first node, and the drain electrode of the fourth transistor is electrically connected to a gate electrode of the fifth transistor;

wherein a source electrode of the fifth transistor receives the current-stage clock signal, and a drain electrode of the fifth transistor is electrically connected to the output end of the current-stage scan signal.

In the GOA circuit provided by the present disclosure, the pull-down module comprises a sixth transistor;

wherein a gate electrode of the sixth transistor is electrically connected to the second node, and a source electrode of the sixth transistor receives the constant voltage low level signal, and a drain electrode of the sixth transistor is electrically connected to the output end of the current-stage scan signal.

In the GOA circuit provided by the present disclosure, the pull-down maintaining module comprises a seventh transistor, an eighth transistor, a ninth transistor, a tenth transistor and an eleventh transistor;

wherein a gate electrode of the seventh transistor receives the first scan control signal, a source electrode of the seventh transistor receives the next-stage clock signal, and a drain electrode of the seventh transistor is electrically connected to a drain electrode of the eighth transistor and a gate electrode of the ninth transistor;

wherein a gate electrode of the eighth transistor receives the second scan control signal, and a source electrode of the eighth transistor receives the previous-stage clock signal;

wherein a source electrode of the ninth transistor receives a constant voltage high level signal, and a drain electrode of the ninth transistor is electrically connected to the second node;

wherein a gate electrode of the tenth transistor is electrically connected to a drain electrode of the eleventh transistor, and a source electrode of the tenth transistor receives the constant voltage low level signal, and a drain electrode of the tenth transistor is electrically connected to the first node;

wherein a gate electrode of the eleventh transistor is connected to a ground end, and a source electrode of the eleventh transistor is connected to the second node.

In the GOA circuit provided by the present disclosure, when the potential of the second node is a potential of the constant voltage high level signal, the tenth transistor is turned off, and a potential of the drain electrode of the eleventh transistor is a potential difference between a potential of the ground end and a threshold voltage of the eleventh transistor.

In the GOA circuit provided by the present disclosure, a voltage difference between a potential of the gate electrode of the tenth transistor and a potential of the drain electrode of the tenth transistor is less than a voltage difference between the potential of the constant voltage high level signal and the potential of the constant voltage low level signal.

In the GOA circuit provided by the present disclosure, the stop control module comprises a twelfth transistor;

wherein a gate electrode of the twelfth transistor receives the stop control signal, and a source electrode of the twelfth transistor receives the constant voltage low level signal, and a drain electrode of the twelfth transistor is electrically connected to the output end of the current-stage scan signal.

In the GOA circuit provided by the present disclosure, the GOA circuit further comprises a thirteenth transistor, a fourteenth transistor, and a fifteenth transistor;

wherein a gate electrode of the thirteenth transistor, a source electrode of the thirteenth transistor, a gate electrode of the fourteenth transistor, and a gate electrode of the fifteenth transistor receive a discharge control signal, and a drain electrode of the thirteenth transistor is electrically connected to the output end of the current-stage scan signal;

wherein a source electrode of the fourteenth transistor receives the constant voltage low level signal, and a drain electrode of the fourteenth transistor is electrically connected to the second node;

wherein a source electrode of the fifteenth transistor receives the constant voltage low level signal, and a drain electrode of the fifteenth transistor is electrically connected to the pull down control module.

Second, the present disclosure further provides a display panel, comprising a GOA circuit, and the GOA circuit comprises a plurality of GOA units disposed in N-stage cascade, and an nth-stage GOA unit comprises a node control module, a pull-up module, a pull-down module, a pull-down maintaining module, and a stop control module, wherein $1<n<N-1$, and both the n and the N are positive integers;

wherein the node control module receives a previous-stage scan signal, a next-stage scan signal, a first scan control signal and a second scan control signal, and is electrically connected to a first node and a second node, and the node control module is configured to pull up a potential of the first node and pull down a potential of the second node according to the previous-stage scan signal, the next-stage scan signal, the first scan control signal and the second scan control signal;

wherein the pull-up module receives a current-stage clock signal, and is electrically connected to the first node, and the pull-up module is configured to output a current-stage scan signal at a current-stage scan signal output end according to the current-stage clock signal and the potential of the first node;

wherein the pull-down module is electrically connected to the second node, and the pull-down module is configured to pull down a potential of a scan signal output end according to the potential of the second node;

wherein the pull-down maintaining module receives a previous-stage clock signal, a next-stage clock signal, the first scan control signal, and the second scan control signal, and is electrically connected to the first node and the second node, and the pull-down maintaining module is configured to pull down the potential of the first node and pull up the potential of the second node according to the previous-stage clock signal, the next-stage clock signal, the first scan control signal and the second scan control signal;

wherein the stop control module receives a stop control signal, and the stop control module is configured to pull down a potential of the output end of the current-stage scan signal based on the stop control signal when the GOA circuit is in a touch stop stage, and the pull-down maintaining module is further configured to suppress an electrical leakage of the first node during the touch stop stage.

In the display panel provided by the present disclosure, the node control module comprises a first transistor, a second transistor, a third transistor, a first capacitor and a second capacitor;

wherein a gate electrode of the first transistor receives the previous-stage scan signal, and a source electrode of the first transistor receives the first scan control signal, and a drain electrode of the first transistor is electrically connected to the first node;

wherein a gate electrode of the second transistor receives the next-stage scan signal, and a source electrode of the second transistor receives the second scan control signal, and a drain electrode of the second transistor is electrically connected to the first node;

wherein a gate electrode of the third transistor is electrically connected to the first node, and a source electrode of the third transistor receives a constant voltage low level signal, and a drain electrode of the third transistor is electrically connected to the second node;

wherein a first end of the first capacitor is electrically connected to the first node, and a second end of the first capacitor receives constant voltage low level signal;

wherein a first end of the second capacitor is electrically connected to the second node, and a second end of the second capacitor receives the constant voltage low level signal.

In the display panel provided by the present disclosure, the pull-up module comprises a fourth transistor and a fifth transistor;

wherein a gate electrode of the fourth transistor receives a constant voltage high level signal, a source electrode of the fourth transistor is electrically connected to the first node, and a drain electrode of the fourth transistor is electrically connected to a gate electrode of the fifth transistor;

wherein a source electrode of the fifth transistor receives the current-stage clock signal, and a drain electrode of the fifth transistor is electrically connected to the output end of the current-stage scan signal.

In the display panel provided by the present disclosure, the pull-down module comprises a sixth transistor;

wherein a gate electrode of the sixth transistor is electrically connected to the second node, and a source electrode of the sixth transistor receives the constant voltage low level signal, and a drain electrode of the sixth transistor is electrically connected to the output end of the current-stage scan signal.

In the display panel provided by the present disclosure, the pull-down maintaining module comprises a seventh transistor, an eighth transistor, a ninth transistor, a tenth transistor and an eleventh transistor;

wherein a gate electrode of the seventh transistor receives the first scan control signal, a source electrode of the seventh transistor receives the next-stage clock signal, and a drain electrode of the seventh transistor is electrically connected to a drain electrode of the eighth transistor and a gate electrode of the ninth transistor;

wherein a gate electrode of the eighth transistor receives the second scan control signal, and a source electrode of the eighth transistor receives the previous-stage clock signal;

wherein a source electrode of the ninth transistor receives a constant voltage high level signal, and a drain electrode of the ninth transistor is electrically connected to the second node;

wherein a gate electrode of the tenth transistor is electrically connected to a drain electrode of the eleventh transistor, and a source electrode of the tenth transistor receives the constant voltage low level signal, and a drain electrode of the tenth transistor is electrically connected to the first node;

wherein a gate electrode of the eleventh transistor is connected to a ground end, and a source electrode of the eleventh transistor is connected to the second node.

In the display panel provided by the present disclosure, when the potential of the second node is a potential of the constant voltage high level signal, the tenth transistor is turned off, and a potential of the drain electrode of the eleventh transistor is a potential difference between a potential of the ground end and a threshold voltage of the eleventh transistor.

In the display panel provided by the present disclosure, a voltage difference between a potential of the gate electrode of the tenth transistor and a potential of the drain electrode of the tenth transistor is less than a voltage difference between the potential of the constant voltage high level signal and the potential of the constant voltage low level signal.

In the display panel provided by the present disclosure, the stop control module comprises a twelfth transistor;

wherein a gate electrode of the twelfth transistor receives the stop control signal, and a source electrode of the twelfth transistor receives the constant voltage low level signal, and a drain electrode of the twelfth transistor is electrically connected to the output end of the current-stage scan signal.

In the display panel provided by the present disclosure, the GOA circuit further comprises a thirteenth transistor, a fourteenth transistor, and a fifteenth transistor;

wherein a gate electrode of the thirteenth transistor, a source electrode of the thirteenth transistor, a gate electrode of the fourteenth transistor, and a gate electrode of the fifteenth transistor receive a discharge control signal, and a drain electrode of the thirteenth transistor is electrically connected to the output end of the current-stage scan signal;

wherein a source electrode of the fourteenth transistor receives the constant voltage low level signal, and a drain electrode of the fourteenth transistor is electrically connected to the second node;

wherein a source electrode of the fifteenth transistor receives the constant voltage low level signal, and a drain electrode of the fifteenth transistor is electrically connected to the pull down control module.

BENEFICIAL EFFECT OF INVENTION

Beneficial Effect

In the GOA circuit and the display panel, the eleventh transistor is disposed between the gate of the tenth transistor and the second node, and the gate electrode of the eleventh transistor is electrically connected to the ground end, thereby reducing a negative drift of the tenth transistor and an increasing tendency of an off-state current, and suppressing the electrical leakage of the first node when the GOA circuit is in the touch stop stage.

BRIEF DESCRIPTION OF DRAWINGS

Description of Drawings

In order to more clearly explain the technical solutions in the embodiments of the present disclosure, the following will briefly introduce the drawings required in the description of the embodiments. Obviously, the drawings in the following description are only some embodiments of the present disclosure. For those skilled in the art, without doing any creative work, other drawings can be obtained based on these drawings.

Figure 1:
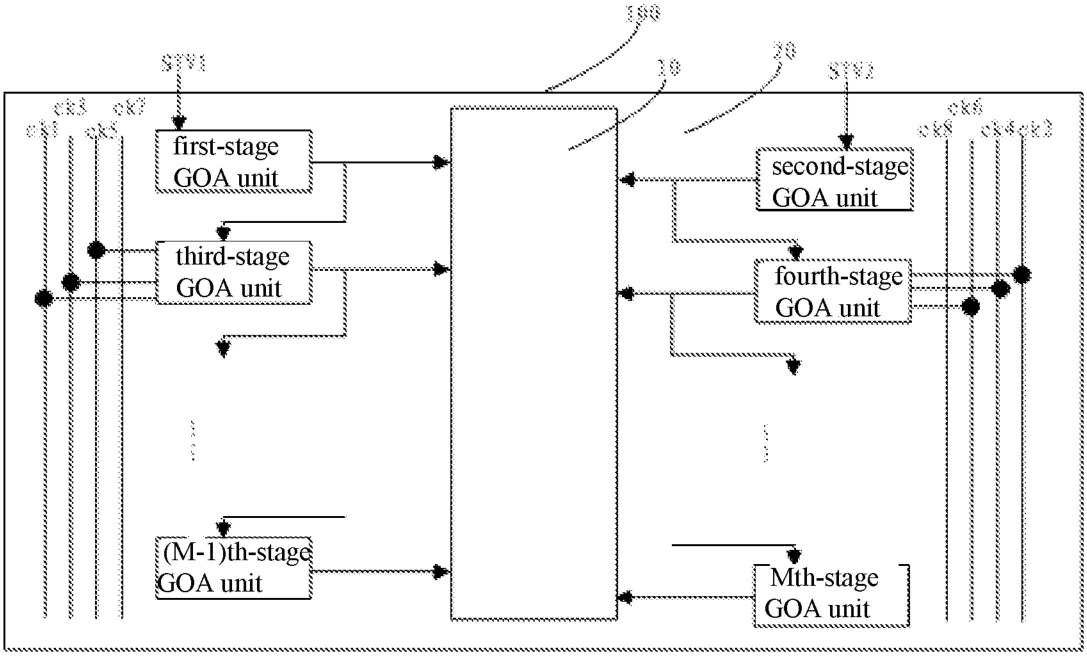

FIG. 1 is a structural schematic diagram of a display panel according to an embodiment of the present disclosure.

Figure 2:
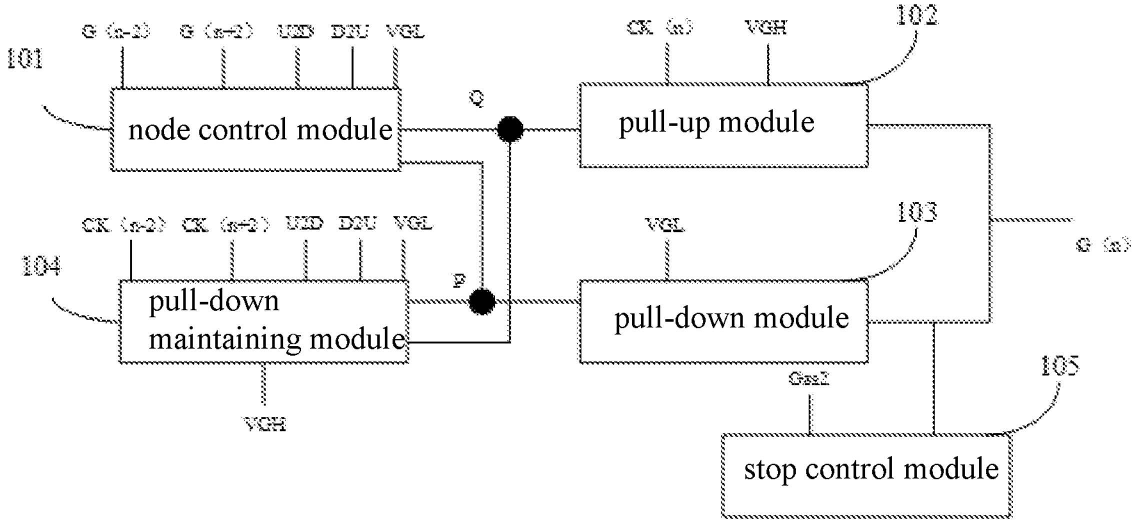

FIG. 2 is a structural schematic diagram of an nth-stage GOA unit in a GOA circuit according to an embodiment of the present disclosure.

Figure 3:
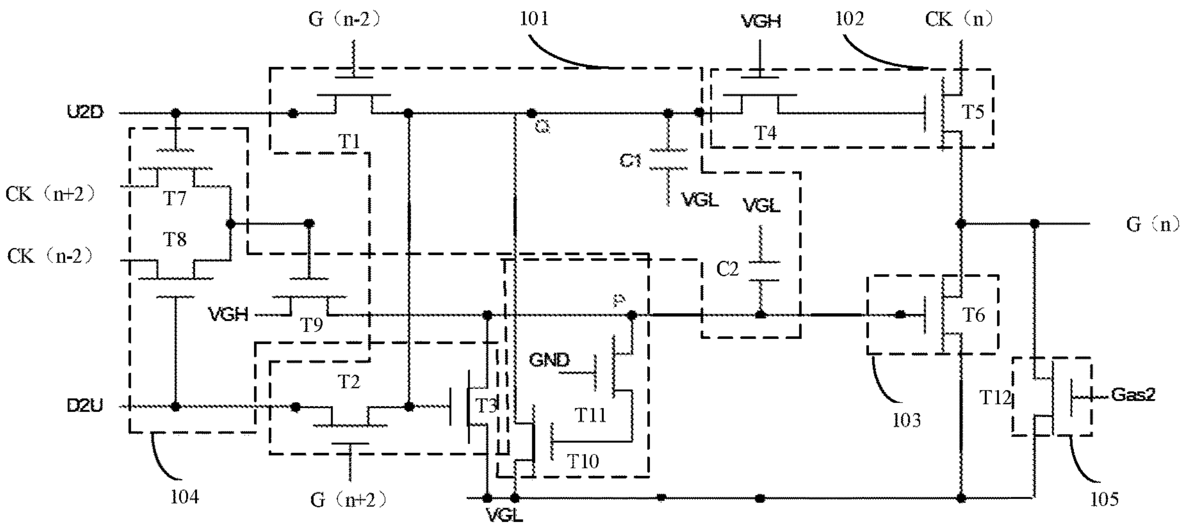

FIG. 3 is a circuit schematic diagram of the nth-stage GOA unit in the GOA circuit according to an embodiment of the present disclosure.

Figure 4:
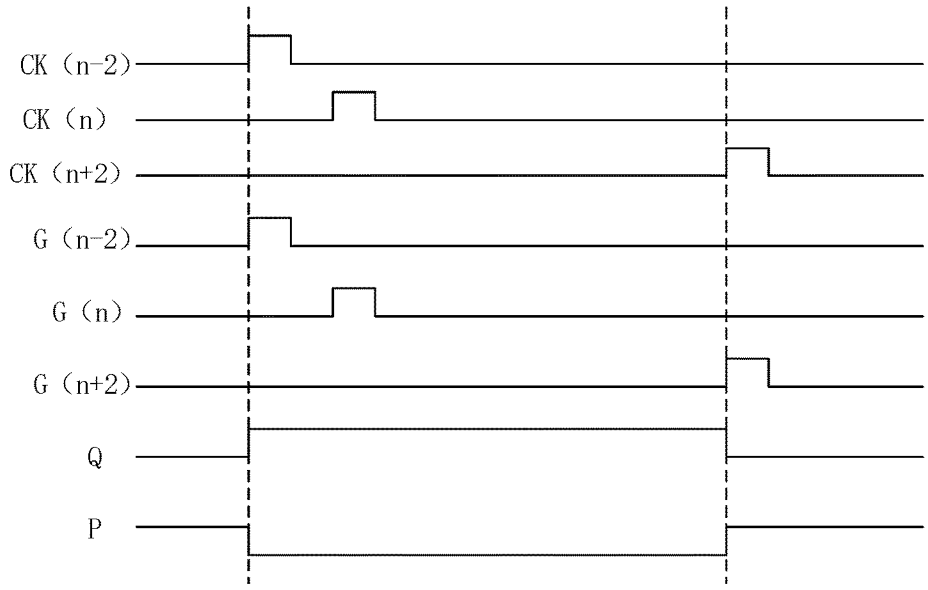

FIG. 4 is a timing sequence schematic diagram of the nth-stage GOA unit in the GOA circuit according to an embodiment of the present disclosure.

Figure 5:
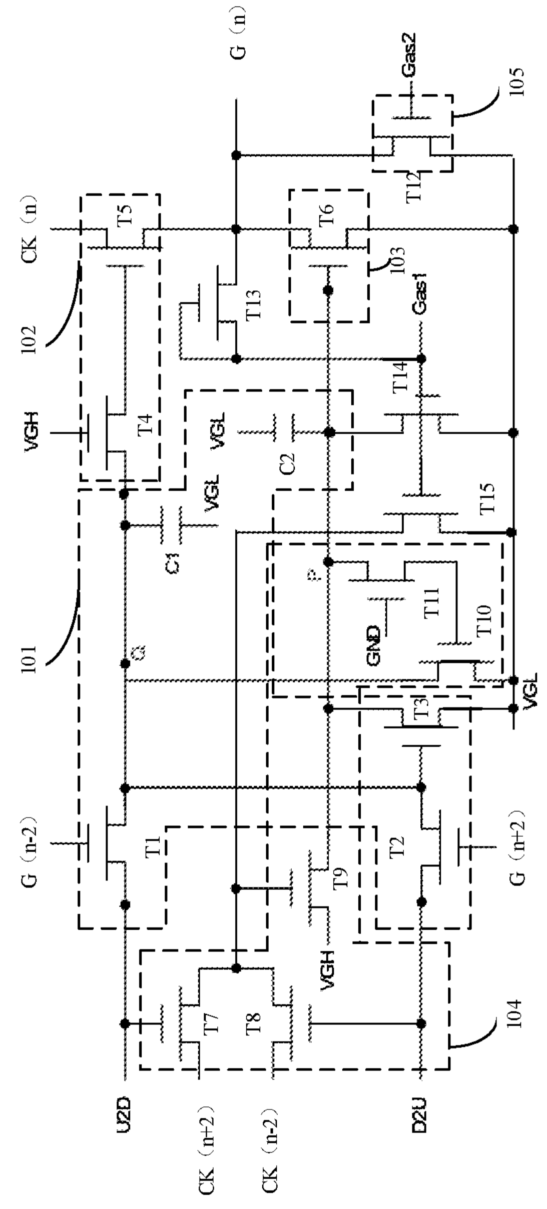

FIG. 5 is an another circuit schematic diagram of the nth-stage GOA unit in the GOA circuit according to an embodiment of the present disclosure.

DETAILED DESCRIPTION OF EMBODIMENTS

Embodiments of Invention

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

The transistors adopted in embodiments of the present disclosure can be thin-film transistors, field effect transistors, or other devices with same characteristics. Since a source electrode and a drain electrode of the transistor are symmetrical, the source electrode and the drain electrode can be interchangeable. In an embodiment of the present disclosure, in order to distinguish two electrodes of the transistor except a gate electrode, one of the two electrodes is called the source electrode, and the other is called the drain electrode. According to the form in the figures, a middle end of the switching transistor is the gate electrode, a signal input end is the source electrode, and a signal output end is the drain electrode.

Please refer to FIG. 1, FIG. 1 is a structural schematic diagram of a display panel according to an embodiment of the present disclosure. As shown in FIG. 1, a display panel 100 according to an embodiment of the present disclosure includes a display area 10, and a GOA circuit area 20 disposed outside the display area 10. A plurality of scan lines, a plurality of data lines, and a plurality of sub-pixel units defined by an intersection of the plurality of scan lines and the plurality of data lines are disposed on the display area 10. A GOA circuit is disposed on the GOA circuit area 20, and the GOA circuit includes a multi-level GOA unit, wherein the multi-level GOA unit is connected to the plurality of scan lines in a one-to-one correspondence. That is, the number of GOA units is equal to the number of scan lines.

Wherein, the GOA circuit can include a plurality of odd-stage GOA units disposed in cascade and a plurality of even-stage GOA units disposed in cascade. The plurality of odd-stage GOA units disposed in cascade are disposed on a side of the display area 10, and the plurality of even-stage GOA units disposed in cascade are disposed on another side of the display area 10. For example, the GOA circuit includes an M-stage GOA unit, and M is a positive integer. When M is an even number, a first-stage GOA unit, a third-stage GOA unit, a fifth-stage GOA unit, . . . , an (M−1)th-stage GOA unit are disposed in cascade, and a second-stage GOA unit, a fourth-stage GOA unit, a sixth-stage GOA unit, . . . , an Mth-stage GOA unit are disposed in cascade.

In an embodiment of the present disclosure, the GOA circuit includes GOA units disposed in N stage cascade. In some embodiments, the GOA units disposed in N stage cascade can be the odd-stage GOA units disposed in cascade, and also can be the even-stage GOA units disposed in cascade.

In an embodiment of the present disclosure, the GOA circuit receives a first clock signal ck1, a second clock signal ck2, a third clock signal ck3, a fourth clock signal ck4, a fifth clock signal ck5, a sixth clock signal ck6, a seventh clock signal ck7, an eighth clock signal ck8, a first start signal STV1, and a second signal STV2. Specifically, the plurality of odd-stage GOA units disposed in cascade receives the first clock signal ck1, the third clock signal ck3, the fifth clock signal ck5, the seventh signal ck7, and the first start signal STV1. The plurality of even-stage GOA units disposed in cascade receives the second clock signal ck2, the fourth clock signal ck4, the sixth clock signal ck6, the eighth signal ck8, and the second start signal STV2.

It should be noted that the GOA circuit provided in an embodiment of the present disclosure can adopt a forward scan mode or a reverse scan mode. When the GOA circuit adopts the forward scan mode, the first start signal is output to a first-stage GOA unit, and the first start signal is used as a previous-stage scan signal of the first-stage GOA unit; the second start signal is output to a second-stage GOA unit, and the second start signal is used as a previous-stage scan signal of the second-state GOA unit. In the plurality of odd-stage GOA units disposed in cascade, the GOA circuit starts from a first-stage GOA unit to a last-stage GOA unit in sequence. In the plurality of even-stage GOA units disposed in cascade, the GOA circuit starts from a second-stage GOA unit to the last-stage GOA unit in sequence.

When the GOA circuit adopts the reverse scan mode, the first start signal is output to an (M−1)th-stage GOA unit, and the first start signal is used as a previous-stage scan signal of the (M−1)th-stage GOA unit; the second start signal is output to an Mth-stage GOA unit, and the second start signal is used as a previous-stage scan signal of the Mth-state GOA unit. In the plurality of odd-stage GOA units disposed in cascade, the GOA circuit starts from the last-stage GOA unit to the first-stage GOA unit in sequence. In the plurality of even-stage GOA units disposed in cascade, the GOA circuit starts from the last-stage GOA unit to the second-stage GOA unit in sequence.

It should be noted that an (8*k*+1)th-stage clock signal and the first clock signal ck1 are the same signal. An (8*k*+2)th-stage clock signal and the second clock signal ck2 are the same signal. An (8*k*+3)th-stage clock signal and the third clock signal ck3 are the same signal. An (8*k*+4)th-stage clock signal and the fourth clock signal ck4 are the same signal. An (8*k*+5)th-stage clock signal and the fifth clock signal ck5 are the same signal. An (8*k*+6)th-stage clock signal and the sixth clock signal ck6 are the same signal. An (8*k*+7)th-stage clock signal and the seventh clock signal ck7 are the same signal. An (8*k*+8)th-stage clock signal and the eighth clock signal ck8 are the same signal. Wherein, the k is greater than or equal to 0, and the k is an integer.

Please refer to FIG. 1 and FIG. 2, FIG. 2 is a structural schematic diagram of an nth-stage GOA unit in the GOA circuit provided by an embodiment of the present disclosure. As shown in FIG. 1 and FIG. 2, the nth-stage GOA unit can be remaining GOA units of the plurality of odd-stage GOA units disposed in cascade except the first-stage GOA unit and a last-stage GOA unit. The nth-stage GOA unit can be remaining GOA units of the plurality of even-stage GOA units disposed in cascade except the second-stage GOA unit and the last-stage GOA unit.

Specifically, in an embodiment of the present disclosure, the nth-stage GOA unit includes a node control module 101, a pull-up module 102, a pull-down module 103, a pull-down maintaining module 104, and a stop control module 105, wherein $1<n<N-1$, and both the n and the N are positive integers, and the N represents a number of cascades of the GOA units.

Wherein, the node control module 101 receives a previous-stage scan line G(n−2), a next-stage scan line G(n+2), a first scan control signal U2D and a second scan control signal D2U, and a constant voltage low level signal VGL, and is electrically connected to a first node Q and a second node P. The node control module 101 is configured to pull down a potential of the first node Q and pull up a potential of the second node P according to the previous-stage scan signal G(n−2), the next-stage scan signal G(n+2), the first scan control signal U2D and the second scan control signal D2U.

Wherein, the pull-up module 102 receives a current-stage clock signal CK(n) and a constant voltage high level signal VGH, and is electrically connected to the first node Q, and the pull-up module 102 is configured to output a current-stage scan signal at an output end G(n) of the current-stage scan signal according to the current-stage clock signal CK(n) and the potential of the first node Q.

Wherein, the pull-down module 103 receives the constant voltage low level signal VGL, and is electrically connected to the second node P. The pull-down module 103 is configured to pull down a potential of a scan signal output end according to the potential of the second node P.

Wherein, the pull-down maintaining module 104 receives a previous-stage clock signal CK(n−2), a next-stage clock signal CK(n+2), the first scan control signal U2D, the second scan control signal D2U, the constant voltage low level signal VGL, and the constant voltage high level signal VGH, and is electrically connected to the first node Q and the second node P. The pull-down maintaining module 104 is configured to pull down the potential of the first node Q and pull up the potential of the second node P according to the previous-stage clock signal CK(n−2), the next-stage clock signal CK(n+2), the first scan control signal U2D and the second scan control signal D2U, the constant voltage low level signal VGL, and the constant voltage high level signal VGH.

Wherein, the stop control module 105 receives a stop control signal Gas2, and the stop control module 105 is configured to pull down a potential of the output end G(n) of the current-stage scan signal based on the stop control signal Gas2 when the GOA circuit is in a touch stop stage. The pull-down maintaining module is further configured to suppress an electrical leakage of the first node Q during the touch stop stage.

The GOA circuit provided by an embodiment of the present disclosure suppresses the electrical leakage of the first node Q through the pull-down maintaining module 104 when the GOA circuit is in the touch stop stage, so as to solve a problem that the GOA circuit is prone to leakage during a long time use, thereby causing a malfunction of the GOA circuit.

Please refer to FIG. 1, FIG. 2, and FIG. 3, and FIG. 3 is a circuit schematic diagram of the nth-stage GOA unit in the GOA circuit according to an embodiment of the present disclosure. The nth-stage GOA will be introduced in detail with reference to FIG. 1, FIG. 2, and FIG. 3.

In some embodiments, the node control module 101 includes a first transistor T1, a second transistor T2, a third transistor T3, a first capacitor C1, and a second capacitor C2. A gate electrode of the first transistor T1 receives the previous-stage scan signal G(n−2), and a source electrode of the first transistor T1 receives the first scan control signal U2D, and a drain electrode of the first transistor T1 is electrically connected to the first node Q. A gate electrode of the second transistor T2 receives the next-stage scan signal G(n+2), and a source electrode of the second transistor T2 receives the second scan control signal D2U, and a drain electrode of the second transistor T2 is electrically connected to the first node Q. Agate electrode of the third transistor T3 is electrically connected to the first node Q, and a source electrode of the third transistor T3 receives the constant voltage low level signal VGL, and a drain electrode of the third transistor T3 is electrically connected to the second node P. A first end of the first capacitor C1 is electrically connected to the first node Q, and a second end of the first capacitor C1 receives the constant voltage low level signal VGL. A first end of the second capacitor C2 is electrically connected to the second node P, and a second end of the second capacitor C2 receives the constant voltage low level signal VGL.

In some embodiments, the pull-up module 102 includes a fourth transistor T4 and a fifth transistor T5. A gate electrode of the fourth transistor T4 receives the constant voltage high level signal VGH, and a source electrode of the fourth transistor T4 is electrically connected to the first node Q, and a drain electrode of the fourth transistor T4 is electrically connected to a gate electrode of the fifth transistor T5. A source electrode of the fifth transistor T5 receives the current-stage clock signal CK(n), and a drain electrode of the fifth transistor T5 is electrically connected to the output end G(n) of the current-stage scan signal.

The pull-down module 103 includes a sixth transistor T6. A gate electrode of the sixth transistor T6 is electrically connected to the second node P. A source electrode of the sixth transistor T6 receives the constant voltage low level signal VGL. A drain electrode of the sixth transistor T6 is electrically connected to the output end G(n) of the current-stage scan signal.

In some embodiments, the pull-down maintaining module 104 includes a seventh transistor T7, an eighth transistor T8, a ninth transistor T9, a tenth transistor T10, and an eleventh transistor T11. A gate electrode of the seventh transistor T7 receives the first scan control signal U2D, a source electrode of the seventh transistor T7 receives the next-stage clock signal CK(n+2), and a drain electrode of the seventh transistor T7 is electrically connected to a drain electrode of the eighth transistor T8 and a gate electrode of the ninth transistor T9. A gate electrode of the eighth transistor T8 receives the second scan control signal D2U, and a source electrode of the eighth transistor T8 receives the previous-stage clock signal CK(n−2). A source electrode of the ninth transistor T9 receives the constant voltage high level signal VGH, and a drain electrode of the ninth transistor T9 is electrically connected to the second node P. Agate electrode of the tenth transistor T10 is electrically connected to a drain electrode of the eleventh transistor T11, and a source electrode of the tenth transistor T10 receives the constant voltage low level signal VGL, and a drain electrode of the tenth transistor T10 is electrically connected to the first node Q. A gate electrode of the eleventh transistor T11 is connected to a ground end GND, and a source electrode of the eleventh transistor T11 is connected to the second node P.

In particular, when the potential of the second node P is a potential of the constant voltage high level signal VGH, a potential of a source electrode of the eleventh transistor T11 is a potential of the constant voltage high level signal VGH, and a potential of a gate electrode of the eleventh transistor T11 is a potential of the ground end GND. At this time, the eleventh transistor T11 is in a saturated state, and the eleventh transistor T11 is turned off. According to characteristics of a transistor, a potential of the drain electrode of the eleventh transistor T11 is a potential difference between a potential of the ground end GND and a threshold voltage of the eleventh transistor T11. That is, a potential of the gate of the tenth transistor T10 is the potential difference between the potential of the ground end GND and the threshold voltage of the eleventh transistor T11. Therefore, the voltage difference between the potential of the gate electrode of the tenth transistor T10 and a potential of the drain electrode of the tenth transistor T10 is less than a voltage difference between the potential of the constant voltage high level signal and the potential of the constant voltage low level signal.

Compared with the prior art that a gate electrode is connected directly to a node, an embodiment of the present disclosure provides an eleventh transistor to be disposed between the gate electrode of the tenth transistor T10 and the second node P, and the gate electrode of the eleventh transistor T11 is electrically connected to the ground end GND, thereby reducing a negative drift of the tenth transistor T10 and an increasing tendency of an off-state current, and suppressing the electrical leakage of the first node Q when the GOA circuit is in the touch stop stage.

In some embodiments, the stop control module includes a twelfth transistor T12. A gate electrode of the twelfth transistor T12 receives the stop control signal Gas2. A source electrode of the twelfth transistor T12 receives the constant voltage low level signal VGL, and a drain electrode of the twelfth transistor T12 is electrically connected to the output end G(n) of the current-stage scan signal.

In particular, when the GOA circuit is in the touch stop stage, a potential of the stop control signal Gas2 is high. The twelfth transistor T12 is turned on under a control of the stop control signal Gas2, and the constant voltage low level signal VGL is output to the output end G(n) of the current-stage scan signal passing through the twelfth transistor T12, thereby making the GOA circuit realize stopping a scan function during a display period. At the same time, since the potential of the first node Q is high, the third transistor T3 is turned on under a control of the potential of the first node Q, and the constant voltage low level signal VGL passing through the third transistor T3 is output to the second node P, making the potential of the second node P be low, thereby making the eleventh transistor 11 be turned on and the tenth transistor 10 be turned off. Since the negative drift of the tenth transistor and the increasing tendency of an off-state current are reduced, the electrical leakage of the first node can be suppressed when the GOA circuit is in the touch stop stage.

Take the GOA circuit in the forward scan mode as an example for description. Please refer to FIG. 3 and FIG. 4, FIG. 4 is a timing sequence schematic diagram of the nth-stage GOA unit in the GOA circuit according to an embodiment of the present disclosure.

As shown in FIG. 3 and FIG. 4, when the GOA circuit is in the forward scan mode, the first scan control signal U2D is the constant voltage high level signal VGH, and the second scan control signal D2U is the constant voltage low level signal VGL. When the GOA circuit is in the reverse scan mode, the first scan control signal U2D is the constant voltage low level signal VGL, and the second scan control signal D2U is the constant voltage high level signal VGH.

First, when the previous-stage scan signal G(n−2) is at a high potential, the first transistor T1 is turned on under a control of the previous-stage scan signal G(n−2), and the first scan control signal U2D charges the first capacitor C1 passing through the first transistor T1, thereby making the potential of the first node Q be high. Since the potential of the first node Q is high, the third transistor T3 is turned on under a control of the potential of the first node Q. The constant voltage low level signal VGL charges the second node P passing through the third transistor T3. Since the potential of the second node P is low, the sixth transistor T6 is turned off under a control of potential of the second node P.

At the same time, a potential of the next-stage clock signal CK(n+2) is still low, and a potential of the current-stage clock signal CK(n) is low. The seventh transistor T7 is turned on under a control of the first scan control signal U2D, and the potential of the next-stage clock signal CK(n+2) passing through the seventh transistor T7 is output to the gate of the ninth transistor T9 to make the ninth transistor T9 turn off. The fourth transistor T4 is turned on under a control of the constant voltage high level signal VGH, and the potential of the first node Q passing through the fourth transistor T4 is output to the gate of the fifth transistor T5. The current-stage clock signal CK(n) passing through the fifth transistor T5 is output to the output end G(n) of the current-stage scan signal, so that the potential of the output end G(n) of the current-stage scan signal is low.

Subsequently, the potential of the previous-stage scan signal G(n−2) changes from a high level to a low level, and the potential of the current-stage clock signal CK(n) changes from a low level to a high level. The first transistor T1 is turned off under a control of the previous-stage scan signal G(n−2). At this time, due to a storage effect of the first capacitor C1 and the second capacitor C2, the potential of the first node Q is high, and the potential of the second node P is low. The fourth transistor T4 is turned on under a control of the constant voltage high level signal VGH, and the potential of the first node Q passing is output to the gate electrode of the fifth transistor T5 to make the fifth transistor T5 turned on. The current-stage clock signal CK(n) passing through the fifth transistor T5 is output to the output end G(n) of the current-stage scan signal, and then the current-stage scan signal is output. Since the potential of the second node P is low, the sixth transistor T6 is turned off under the control of the potential of the second node P.

At the same time, the potential of the next-stage clock signal CK(n+2) is still low, the seventh transistor T7 is turned on under a control of the first scan control signal U2D, and the potential of the next-stage clock signal CK(n+2) passing through the seventh transistor T7 is output to the gate electrode of the ninth transistor T9 to make the ninth transistor T9 turned off.

Finally, the potential of the next-stage clock signal CK(n+2) changes from low to high, the seventh transistor T7 is turned on under a control of the first scan control signal U2D, and the potential of the next-stage clock signal CK(n+2) passing through the seventh transistor T7 is output to the gate electrode of the ninth transistor T9 to make the ninth transistor T9 turned on. The constant voltage high level signal VGH passing through the ninth transistor T9 is output to the second node P, so that the potential of the second node P is high. The sixth transistor T6 is turned on under a control of the potential of the second node P, and the constant voltage low level signal VGL passing through the sixth transistor T6 is output to the output end G(n) of the current-stage scan signal, thereby lowering the potential of the current-stage scan signal.

At the same time, since the potential of the source of the eleventh transistor T11 is high, the potential of the gate electrode of the eleventh transistor T11 is a potential of the ground electrode GND making the eleventh transistor T11 turned off. According to characteristics of a transistor, a potential of the drain electrode of the eleventh transistor T11 is a potential difference between a potential of the ground end GND and a threshold voltage of the eleventh transistor T11. The tenth transistor T10 is turned on under a control of the potential of the drain electrode of the eleventh transistor T11, and the constant voltage low level signal VGL passing through the tenth transistor T10 is output to the first node, thereby lowering the potential of the first node Q.

It should be noted that, compared with the prior art that a gate of a transistor is directly connected to a node, the eleventh transistor T11 is disposed between the gate of the tenth transistor T10 and the second node P in an embodiment of the present disclosure, and the gate electrode of the eleventh transistor T11 is electrically connected to the ground end GND, thereby reducing a negative drift of the tenth transistor T10 and an increasing tendency of an off-state current, and suppressing the electrical leakage of the first node Q when the GOA circuit is in the touch stop stage. When the GOA circuit is in the touch stop stage, a potential of the stop control signal Gas2 is high, and the twelfth transistor T12 is turned on under a control of the stop control signal Gas2. The constant voltage low level signal VGL passing through the twelfth transistor T12 is output to the output end G(n) of the current-stage scan signal, thereby making a scan function of the GOA circuit be suspended. At the same time, since the potential of the first node Q is high, the third transistor T3 is turned on under a control of the potential of the first node Q. The constant voltage low level signal VGL passing through the third transistor T3 is output to the second node P, thereby making the potential of the second node P be low, and making the eleventh transistor T111 turned on and the tenth transistor T10 turned off. Since the negative drift of the tenth transistor T10 and the increasing tendency of an off-state current is reduced, an electrical leakage can be suppressed when the GOA circuit is in the touch stop stage.

Please refer to FIG. 5, FIG. 5 is an another circuit schematic diagram of the nth-stage GOA unit in the GOA circuit according to an embodiment of the present disclosure. Wherein, a difference between the nth-stage GOA unit shown in FIG. 5 and the nth-stage GOA unit shown in FIG. 3 is that the nth-stage GOA unit shown in FIG. 5 further includes a thirteenth transistor T13, a fourteenth transistor T14, and a fifteenth transistor T15.

A gate electrode of the thirteenth transistor T13, a source electrode of the thirteenth transistor T13, a gate electrode of the fourteenth transistor T14, and a gate electrode of the fifteenth transistor T15 receive a discharge control signal, and a drain electrode of the thirteenth transistor T13 is electrically connected to the output end G(n) of the current-stage scan signal. A source electrode of the fourteenth transistor T14 receives the constant voltage low level signal VGL, and a drain electrode of the fourteenth transistor T14 is electrically connected to the second node P. A source electrode of the fifteenth transistor T15 receives the constant voltage low level signal VGL, and a drain electrode of the fifteenth transistor T15 is electrically connected to the pull down control module 104. Specifically, the drain electrode of the fifteenth transistor T15, the drain electrode of the seventh transistor, and the drain electrode of the eight transistor are electrically connected.

When the discharge control signal Gas1 is high, the thirteenth transistor T13, the fourteenth transistor T14, and the fifteenth transistor T15 are turned on under a control of the discharge control signal Gas1. The discharge control signal Gas1 passing through the thirteenth transistor T13 is output to the output end G(n) of the current-stage scan signal, and the constant voltage low level signal VGL passing through the fourteenth transistor T14 is output to the first node Q, and the constant voltage low level signal VGL passing through the fifteenth transistor T15 is output to the gate electrode of the ninth transistor, thereby making the potential of the output end G(n) of the current-stage scan signal be high.

That is, in the embodiment, the thirteenth transistor T13, the fourteenth transistor T14, and the fifteenth transistor T15 are can be provided in each GOA unit, so that scan lines of the display panel can receive scan signals by the discharge control signal Gas1, and then the display panel can be discharged.

The above are only examples of the present disclosure and do not limit the scope of the present disclosure. Any equivalent structure or equivalent process transformation made using the description and drawings of the present disclosure, or directly or indirectly applied to other related technical fields, are included in the scope of patent protection of the present disclosure.

What is claimed is:

1. A gate driver on array (GOA) circuit, comprising a plurality of GOA units disposed in N-stage cascade, and an nth-stage GOA unit comprises a node control module, a pull-up module, a pull-down module, a pull-down maintaining module, and a stop control module, wherein $1<n<N-1$, and both the n and the N are positive integers;

wherein the node control module receives a previous-stage scan signal, a next-stage scan signal, a first scan control signal, and a second scan control signal, and is electrically connected to a first node and a second node, and the node control module is configured to pull up a potential of the first node and pull down a potential of the second node according to the previous-stage scan signal, the next-stage scan signal, the first scan control signal, and the second scan control signal;

wherein the pull-up module receives a current-stage clock signal, and is electrically connected to the first node, and the pull-up module is configured to output a current-stage scan signal at a current-stage scan signal output end according to the current-stage clock signal and the potential of the first node;

wherein the pull-down module is electrically connected to the second node, and the pull-down module is configured to pull down a potential of a scan signal output end according to the potential of the second node;

wherein the pull-down maintaining module receives a previous-stage clock signal, a next-stage clock signal, the first scan control signal, and the second scan control signal, and is electrically connected to the first node and the second node, and the pull-down maintaining module is configured to pull down the potential of the first node and pull up the potential of the second node according to the previous-stage clock signal, the next-stage clock signal, the first scan control signal, and the second scan control signal; and wherein the stop control module receives a stop control signal, and the stop control module is configured to pull down a potential of the output end of the current-stage scan signal based on the stop control signal when the GOA circuit is in a touch stop stage, and the pull-down maintaining module is further configured to suppress an electrical leakage of the first node during the touch stop stage.

2. The GOA circuit as claimed in claim 1, wherein the node control module comprises a first transistor, a second transistor, a third transistor, a first capacitor, and a second capacitor;

wherein a gate electrode of the first transistor receives the previous-stage scan signal, a source electrode of the first transistor receives the first scan control signal, and a drain electrode of the first transistor is electrically connected to the first node;

wherein a gate electrode of the second transistor receives the next-stage scan signal, a source electrode of the second transistor receives the second scan control signal, and a drain electrode of the second transistor is electrically connected to the first node;

wherein a gate electrode of the third transistor is electrically connected to the first node, a source electrode of the third transistor receives a constant voltage low level signal, and a drain electrode of the third transistor is electrically connected to the second node;

wherein a first end of the first capacitor is electrically connected to the first node, and a second end of the first capacitor receives the constant voltage low level signal; and wherein a first end of the second capacitor is electrically connected to the second node, and a second end of the second capacitor receives the constant voltage low level signal.

3. The GOA circuit as claimed in claim 1, wherein the pull-up module comprises a fourth transistor and a fifth transistor;

wherein a gate electrode of the fourth transistor receives a constant voltage high level signal, a source electrode of the fourth transistor is electrically connected to the first node, and a drain electrode of the fourth transistor is electrically connected to a gate electrode of the fifth transistor; and wherein a source electrode of the fifth transistor receives the current-stage clock signal, and a drain electrode of the fifth transistor is electrically connected to the output end of the current-stage scan signal.

4. The GOA circuit as claimed in claim 1, wherein the pull-down module comprises a sixth transistor;

wherein a gate electrode of the sixth transistor is electrically connected to the second node, a source electrode of the sixth transistor receives a constant voltage low level signal, and a drain electrode of the sixth transistor is electrically connected to the output end of the current-stage scan signal.

5. The GOA circuit as claimed in claim 1, wherein the pull-down maintaining module comprises a seventh transistor, an eighth transistor, a ninth transistor, a tenth transistor and an eleventh transistor;

wherein a gate electrode of the seventh transistor receives the first scan control signal, a source electrode of the seventh transistor receives the next-stage clock signal, and a drain electrode of the seventh transistor is electrically connected to a drain electrode of the eighth transistor and a gate electrode of the ninth transistor;

wherein a gate electrode of the eighth transistor receives the second scan control signal, and a source electrode of the eighth transistor receives the previous-stage clock signal;

wherein a source electrode of the ninth transistor receives a constant voltage high level signal, and a drain electrode of the ninth transistor is electrically connected to the second node;

wherein a gate electrode of the tenth transistor is electrically connected to a drain electrode of the eleventh transistor, and a source electrode of the tenth transistor receives a constant voltage low level signal, and a drain electrode of the tenth transistor is electrically connected to the first node; and wherein a gate electrode of the eleventh transistor is connected to a ground end, and a source electrode of the eleventh transistor is connected to the second node.

6. The GOA circuit as claimed in claim 5, wherein, when the potential of the second node is a potential of the constant voltage high level signal, the tenth transistor is turned off, and a potential of the drain electrode of the eleventh transistor is a potential difference between a potential of the ground end and a threshold voltage of the eleventh transistor.

7. The GOA circuit as claimed in claim 6, wherein a voltage difference between a potential of the gate electrode of the tenth transistor and a potential of the drain electrode of the tenth transistor is less than a voltage difference between the constant voltage high potential and the constant voltage low potential.

8. The GOA circuit as claimed in claim 1, wherein the stop control module comprises a twelfth transistor;

wherein a gate electrode of the twelfth transistor receives the stop control signal, a source electrode of the twelfth transistor receives a constant voltage low level signal, and a drain electrode of the twelfth transistor is electrically connected to the output end of the current-stage scan signal.

9. The GOA circuit as claimed in claim 1, wherein the GOA circuit further comprises a thirteenth transistor, a fourteenth transistor, and a fifteenth transistor;

wherein a gate electrode of the thirteenth transistor, a source electrode of the thirteenth transistor, a gate electrode of the fourteenth transistor, and a gate electrode of the fifteenth transistor receive a discharge control signal, and a drain electrode of the thirteenth transistor is electrically connected to the output end of the current-stage scan signal;

wherein a source electrode of the fourteenth transistor receives a constant voltage low level signal, and a drain electrode of the fourteenth transistor is electrically connected to the second node; and wherein a source electrode of the fifteenth transistor receives the constant voltage low level signal, and a drain electrode of the fifteenth transistor is electrically connected to the pull down control module.

10. A display panel, comprising a GOA circuit, and the GOA circuit comprises a plurality of GOA units disposed in N-stage cascade, and an nth-stage GOA unit comprises a node control module, a pull-up module, a pull-down module, a pull-down maintaining module, and a stop control module, wherein $1<n<N-1$, and both the n and the N are positive integers;

wherein the node control module receives a previous-stage scan signal, a next-stage scan signal, a first scan control signal, and a second scan control signal, and is electrically connected to a first node and a second node, and the node control module is configured to pull up a potential of the first node and pull down a potential of the second node according to the previous-stage scan signal, the next-stage scan signal, the first scan control signal, and the second scan control signal;

wherein the pull-up module receives a current-stage clock signal, and is electrically connected to the first node, and the pull-up module is configured to output a current-stage scan signal at a current-stage scan signal output end according to the current-stage clock signal and the potential of the first node;

wherein the pull-down module is electrically connected to the second node, and the pull-down module is configured to pull down a potential of a scan signal output end according to the potential of the second node;

wherein the pull-down maintaining module receives a previous-stage clock signal, a next-stage clock signal, the first scan control signal, and the second scan control signal, and is electrically connected to the first node and the second node, and the pull-down maintaining module is configured to pull down the potential of the first node and pull up the potential of the second node according to the previous-stage clock signal, the next-stage clock signal, the first scan control signal, and the second scan control signal; and wherein the stop control module receives a stop control signal, and the stop control module is configured to pull down a potential of the output end of the current-stage scan signal based on the stop control signal when the GOA circuit is in a touch stop stage, and the pull-down maintaining module is further configured to suppress an electrical leakage of the first node during the touch stop stage.

11. The display panel as claimed in claim 10, wherein the node control module comprises a first transistor, a second transistor, a third transistor, a first capacitor, and a second capacitor;

wherein a gate electrode of the first transistor receives the previous-stage scan signal, a source electrode of the first transistor receives the first scan control signal, and a drain electrode of the first transistor is electrically connected to the first node;

wherein a gate electrode of the second transistor receives the next-stage scan signal, a source electrode of the second transistor receives the second scan control signal, and a drain electrode of the second transistor is electrically connected to the first node;

wherein a gate electrode of the third transistor is electrically connected to the first node, a source electrode of the third transistor receives a constant voltage low level signal, and a drain electrode of the third transistor is electrically connected to the second node;

wherein a first end of the first capacitor is electrically connected to the first node, and a second end of the first capacitor receives the constant voltage low level signal; and wherein a first end of the second capacitor is electrically connected to the second node, and a second end of the second capacitor receives the constant voltage low level signal.

12. The display panel as claimed in claim 10, wherein the pull-up module comprises a fourth transistor and a fifth transistor;

wherein a gate electrode of the fourth transistor receives a constant voltage high level signal, and a source electrode of the fourth transistor is electrically connected to the first node, and a drain electrode of the fourth transistor is electrically connected to a gate electrode of the fifth transistor; and wherein a source electrode of the fifth transistor receives the current-stage clock signal, and a drain electrode of the fifth transistor is electrically connected to the output end of the current-stage scan signal.

13. The display panel as claimed in claim 10, wherein the pull-down module comprises a sixth transistor;

wherein a gate electrode of the sixth transistor is electrically connected to the second node, a source electrode of the sixth transistor receives a constant voltage low level signal, and a drain electrode of the sixth transistor is electrically connected to the output end of the current-stage scan signal.

14. The display panel as claimed in claim 10, wherein the pull-down maintaining module comprises a seventh transistor, an eighth transistor, a ninth transistor, a tenth transistor and an eleventh transistor;

wherein a gate electrode of the seventh transistor receives the first scan control signal, a source electrode of the seventh transistor receives the next-stage clock signal, and a drain electrode of the seventh transistor is electrically connected to a drain electrode of the eighth transistor and a gate electrode of the ninth transistor;

wherein a gate electrode of the eighth transistor receives the second scan control signal, and a source electrode of the eighth transistor receives the previous-stage clock signal;

wherein a source electrode of the ninth transistor receives a constant voltage high level signal, and a drain electrode of the ninth transistor is electrically connected to the second node;

wherein a gate electrode of the tenth transistor is electrically connected to a drain electrode of the eleventh transistor, a source electrode of the tenth transistor receives a constant voltage low level signal, and a drain electrode of the tenth transistor is electrically connected to the first node; and wherein a gate electrode of the eleventh transistor is connected to a ground end, and a source electrode of the eleventh transistor is connected to the second node.

15. The display panel as claimed in claim 14, wherein, when the potential of the second node is a potential of the constant voltage high level signal, the tenth transistor is turned off, and a potential of the drain electrode of the eleventh transistor is a potential difference between a potential of the ground end and a threshold voltage of the eleventh transistor.

16. The display panel as claimed in claim 15, wherein a voltage difference between a potential of the gate electrode of the tenth transistor and a potential of the drain electrode of the tenth transistor is less than a voltage difference between the constant voltage high potential and the constant voltage low potential.

17. The display panel as claimed in claim 10, wherein the stop control module comprises a twelfth transistor;

wherein a gate electrode of the twelfth transistor receives the stop control signal, a source electrode of the twelfth transistor receives a constant voltage low level signal, and a drain electrode of the twelfth transistor is electrically connected to the output end of the current-stage scan signal.

18. The display panel as claimed in claim 10, wherein the GOA circuit further comprises a thirteenth transistor, a fourteenth transistor, and a fifteenth transistor;

wherein a gate electrode of the thirteenth transistor, a source electrode of the thirteenth transistor, a gate electrode of the fourteenth transistor, and a gate electrode of the fifteenth transistor receive a discharge control signal, and a drain electrode of the thirteenth transistor is electrically connected to the output end of the current-stage scan signal;

wherein a source electrode of the fourteenth transistor receives a constant voltage low level signal, and a drain electrode of the fourteenth transistor is electrically connected to the second node; and wherein a source electrode of the fifteenth transistor receives the constant voltage low level signal, and a drain electrode of the fifteenth transistor is electrically connected to the pull down control module.

* * * * *